US007652865B2

(12) United States Patent
Woo et al.

(10) Patent No.: US 7,652,865 B2
(45) Date of Patent: Jan. 26, 2010

(54) EARTHING DEVICE WHICH NEEDS NOT BE BURIED UNDER GROUND

(75) Inventors: Jea Wook Woo, Seoul (KR); Jin Seok Huh, Gyeonggi-do (KR); Seungjoon Ahn, Daejeon (KR); Seong Joon Ahn, Seoul (KR); Chul Geun Park, Chungcheongnam-do (KR); Ho Sub Son, Seoul (KR); Jin Seok Jin, Seoul (KR); Hyung Gu Jeon, Gyeonggi-do (KR)

(73) Assignee: Ground Co., Ltd., Seongnam-Si (KR)

( * ) Notice: Subject to any disclaimer, the term of this patent is extended or adjusted under 35 U.S.C. 154(b) by 455 days.

(21) Appl. No.: 11/587,413

(22) PCT Filed: Jul. 24, 2006

(86) PCT No.: PCT/KR2006/002907

§ 371 (c)(1),
(2), (4) Date: Oct. 24, 2006

(87) PCT Pub. No.: WO2007/114543

PCT Pub. Date: Oct. 11, 2007

(65) Prior Publication Data

US 2008/0002327 A1 Jan. 3, 2008

(30) Foreign Application Priority Data

Apr. 3, 2006 (KR) ..................... 10-2006-0030163

(51) Int. Cl.
*H05F 3/02* (2006.01)
*H02H 7/04* (2006.01)
*H02H 9/06* (2006.01)
*H02H 1/00* (2006.01)
*H02G 13/00* (2006.01)
*H01R 4/66* (2006.01)

(52) U.S. Cl. ........................ 361/220; 361/40; 361/117; 361/126; 174/2; 174/6

(58) Field of Classification Search .................... 174/2, 174/6; 361/40, 117, 126, 220, 435, 436
See application file for complete search history.

(56) References Cited

U.S. PATENT DOCUMENTS

| | | | | | |
|---|---|---|---|---|---|
| 1,004,534 | A | * | 9/1911 | Creighton | 361/500 |
| 1,437,189 | A | * | 11/1922 | Mershon | 361/436 |
| 2,195,431 | A | * | 4/1940 | Harlow et al. | 422/186.04 |
| 3,769,538 | A | * | 10/1973 | Harris | 313/233 |
| 4,577,053 | A | | 3/1986 | Kies | |
| 4,713,092 | A | * | 12/1987 | Kikuchi et al. | 96/70 |
| 7,008,244 | B2 | | 3/2006 | Alladice | |

FOREIGN PATENT DOCUMENTS

| | | |
|---|---|---|
| JP | A-04-126377 | 4/1992 |
| JP | A 10-312840 | 11/1998 |
| KR | 1999-0073507 A1 | 10/1999 |

* cited by examiner

*Primary Examiner*—Stephen W Jackson
*Assistant Examiner*—Scott Bauer
(74) *Attorney, Agent, or Firm*—Oliff & Berridge, PLC

(57) ABSTRACT

An earthing device which needs not be buried under the ground is provided. The earthing device includes an earthing panel and a discharging device mounted inside the earthing panel. The discharging device includes at least one electrode plate, multiple discharging electrodes coupled to the electrode plate, and catalyst filled between the discharging electrodes. Since an earth electrode needs not be buried under the ground, it requires less construction costs, time and area, and environmental pollution (especially, soil pollution) does not happen. Further, the earthing device can be simply and economically installed regardless of place.

19 Claims, 6 Drawing Sheets

EARTHING DEVICE WHICH NEEDS NOT BE BURIED UNDER GROUND

TECHNICAL FIELD

The present invention relates to an earthing device, and more particularly to an earthing device which needs not be buried under the ground.

BACKGROUND ART

In order to secure a stable operation of a high-tech electronic equipment and protect human life from an electrical accident and an excess voltage by lightning, electrical surge, static electricity, earth fault or the like, an earthing is necessarily required. Because the conventional earthing is performed by burying an earthing rod under the ground, there are many problems of not only constructing costs, time and area but also environmental pollution (especially, soil pollution).

FIG. 1 is a schematic view showing an earthing device of a prior art. As shown in the drawing, a lightning rod 50 and electric, electronic and communication equipment 31*a*, 31*b* and 31*c* are earthed to the ground through earthing rods 50*a* and 30*a*. When the electric, electronic and communication equipment 31*a*, 31*b* and 31*c* are provided in plural, they are connected to an MGB (Main Ground Board) 40, and the MGB 40 is connected to the earthing rod 30*a*. The electric, electronic and communication equipment 31*a*, 31*b* and 31*c* operate by receiving power branching from a panel board 20. The panel board 20 receives power through a transformer 10. The transformer 10 is also earthed to the ground through an earthing rod 10*a*. Instead of the earthing rod 10*a*, a bare copper wire (mesh grounding) 32*a* or a copper earth plate 33*a* may be used.

However, since the earthing of the prior art is performed by boring or digging in the ground and burying an earth electrode, such as the earthing rod, the bare copper wire or the copper earth plate, under the ground, it requires much construction costs and time and needs a large area for burying the earth electrode. Especially, it is very difficult and takes much cost to bury the earth electrode under the ground and draw out an earth wire in a downtown region due to lots of skyscrapers and limitations of construction area.

Because a soil resistivity is different in each case, the number of the earth electrodes for acquiring a target earth resistance value is varied according to circumstances. The soil resistivity is a very important element in earthing. Generally, the soil resistivity ranges from hundreds of ohm-meter (Ωm) to thousands of ohm-meter (Ωm), and averages between 300 to 1,000 Ωm. Because of such a high soil resistivity, fault current by lightning, electrical surge, noise, static electricity or earth fault is not discharged promptly to the ground, which occasionally causes electrical accidents.

Recently, since a variety of high-tech equipment capable of operating with a low voltage has been increasingly used, a small earth resistance value is required. Therefore, still more earth electrodes should be buried under the ground, which causes problems of larger area for burying the earth electrodes and more construction costs and time.

DISCLOSURE

[Technical Problem]

Therefore, the present invention has been made in view of the above problems, and it is an object of the present invention to provide an earthing device which can achieve a better earthing effect by discharging fault current more effectively while not being buried under the ground.

[Technical Solution]

In accordance with an aspect of the present invention, the above and other objects can be accomplished by the provision of an earthing device including an earthing panel and a discharging device mounted inside the earthing panel, characterized in that: the discharging device includes at least one electrode plate, multiple discharging electrodes coupled to the electrode plate, and catalyst filled between the discharging electrodes.

Preferably, the discharging device may include first and second electrode plates which are disposed opposite to each other, the discharging electrodes coupled to the first electrode plate may be arranged alternately with the discharging electrodes coupled to the second electrode plate, and heat wires may be connectingly mounted between the first and second electrode plates.

Preferably, each of the discharging electrodes may have a plate shape, and be formed with a plurality of discharging needles protruding from a side surface of the discharging electrode and a plurality of through-holes.

Preferably, each of the discharging needles may be pointed at an end, and made from a metal material.

Preferably, each of the discharging electrodes may have a rod shape, and be formed with a plurality of discharging needles protruding radially around an outer surface of the discharging electrode.

Preferably, the catalyst may contain one selected from the group consisting of carbon, graphite, bentonite, zeolite, zinc oxide, bismuth, praseodymium, cobalt, manganese, antimon, lynconite, silicon carbide, silicon, germanium, argon gas, copper sulfate solution, potassium hydroxide solution, electrolyte, plaster, cement and combination thereof as a principal component.

Preferably, the earthing panel may include an MGB terminal which is connected to an MGB of equipment to be earthed, an N-terminal which is connected to an earth wire of a transformer for supplying power to the equipment, and an L-terminal which is connected to a power cable of the transformer.

Preferably, the earthing device may include two or more discharging devices, the first electrode plate of one of the discharging devices is connected to the N-terminal, the first electrode plate of other discharging device is connected to the L-terminal, and the second electrode plate of each of the discharging devices is connected to the MGB terminal.

Preferably, filters may be mounted in series between the N-terminal and the discharging device and between the MGB terminal and the discharging device.

Preferably, a constant voltage element may be mounted in series between the L-terminal and the discharging device, and a constant voltage element may be mounted in parallel with respect to the discharging device between the N-terminal and the L-terminal.

Preferably, the earthing panel may include two or more L-terminals, and a constant voltage element may be mounted in parallel with respect to the discharging device between the L-terminals.

[Advantageous Effects]

According to an earthing device in accordance with the present invention, since an earth electrode needs not be buried under the ground, the problems of the prior art described above can be overcome, and the earthing device can be simply and economically installed regardless of place. As such, a common earthing system, an equipotential and stabilization of a reference potential can be achieved according to international standards.

Further, the earthing device in accordance with the present invention is configured to satisfy both lightning protection system and earthing system, to thereby secure a stable operation of a high-tech electronic equipment and protect human life from an electrical accident and an excess voltage by lightning, electrical surge, static electricity, earth fault or the like.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the annexed drawings.

First Embodiment

Figure 2:
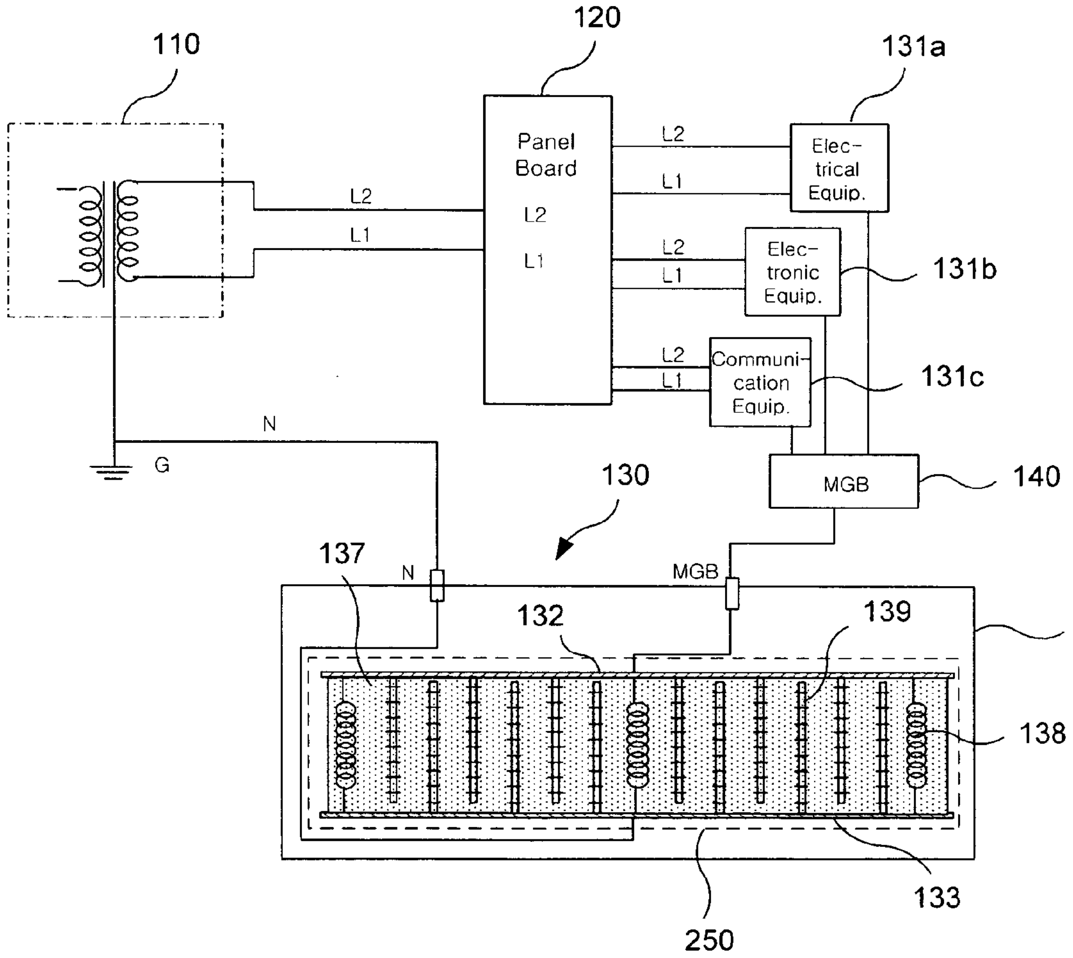
FIG. 2 is a schematic view showing an earthing device in accordance with a preferred embodiment of the present invention.

FIG. 2 is a schematic view showing an earthing device in accordance with a preferred embodiment of the present invention. As shown in the drawing, an earthing device 130 comprises an earthing panel 131 and a discharging device 250 mounted inside the earthing panel 131. Fault current generated at electric equipment 131*a*, electronic equipment 131*b* and communication equipment 131*c* flows to an MGB (Main Ground Board) terminal of the earthing panel 131 via an MGB 140.

The discharging device 250 includes an upper electrode plate 132 and a lower electrode plate 133, which are arranged opposite to each other. The MGB terminal of the earthing panel 131 is connected to the upper electrode plate 132 of the discharging device 250. The discharging device 250 further includes multiple discharging electrodes 139 protruding from the upper and lower electrode plates 132 and 133, and catalyst 137 filled between the discharging electrodes 139. As a contact area between the discharging electrodes 139 and the catalyst 137 is increased, the discharging is performed faster. For this reason, the discharging electrodes 139 protruding from the upper electrode plate 132 and the discharging electrodes 139 protruding from the lower electrode plate 133 are arranged alternately to increase a discharging capacity.

Multiple heat wires 138 are positioned between the upper and lower electrode plates 132 and 133 to connect them in series. So, the fault current transmitted from the MGB 140 is transformed promptly into heat energy by the heat wires 138, thereby achieving the discharging more smoothly.

Figure 1:
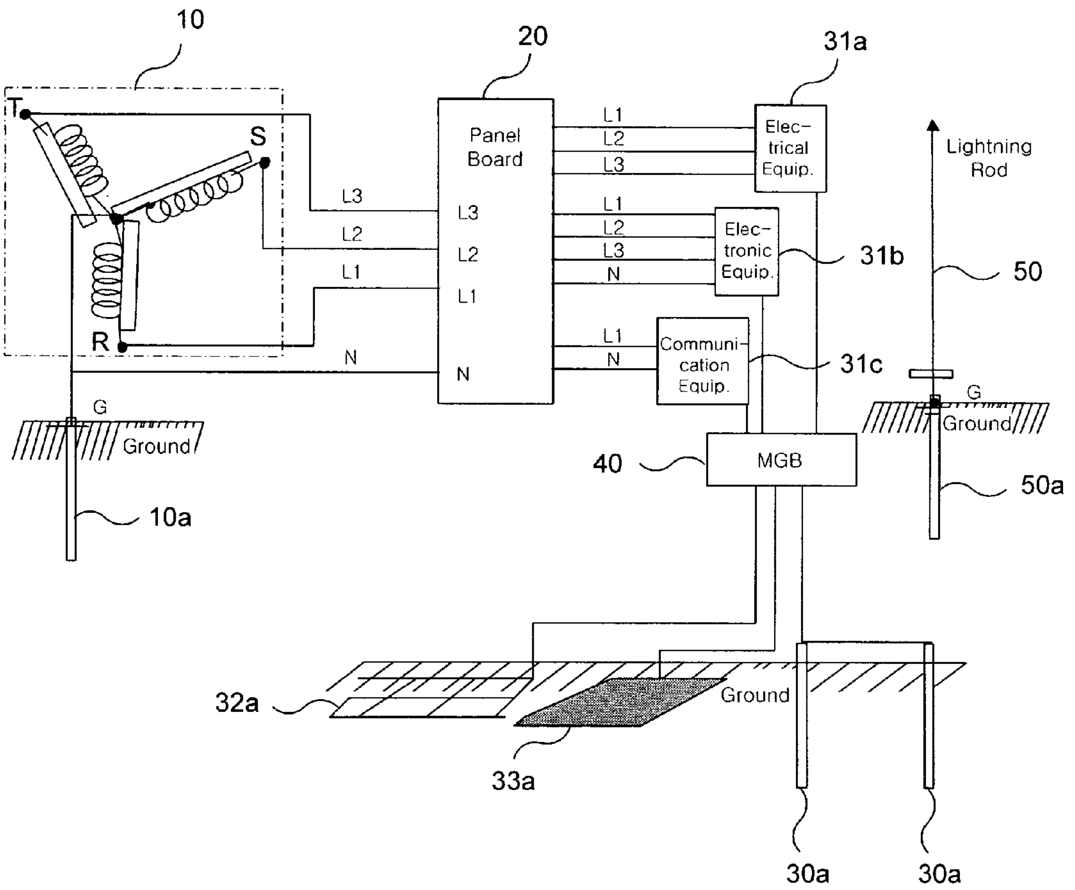
Fig. 1 (Prior Art)
FIG. 1 is a schematic view showing an earthing device of a prior art.

The electric, electronic and communication equipment 131*a*, 131*b* and 131*c* operate by receiving power branching from a panel board 120. The panel board 120 receives power through a transformer 110. If an earth wire (an N-wire) of the transformer 110 is connected to the lower electrode plate 133 through an N-terminal of the earthing panel 131, an equipotential is formed between a reference potential of the transformer 110 and the earthing of the equipment 131*a*, 131*b* and 131*c*. Thus, human life can be protected and the expensive high-tech equipment can operate safely. In the prior art, because the earth wire (the N-wire) of the transformer 10 is not connected to the earthing rod 30*a* of the electric, electronic and communication equipment 31*a*, 31*b* and 31*c*, a potential difference is generated between a reference potential of the transformer 10 and the earthing rod 30*a* (see FIG. 1).

Figure 3:
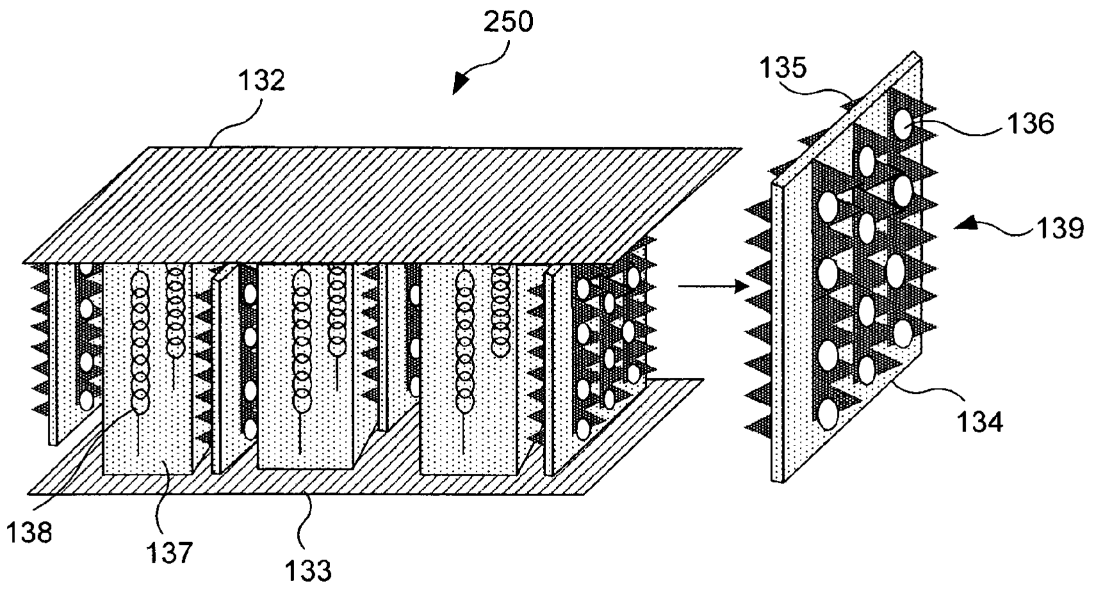
FIG. 3 is a perspective view showing a discharging device of an earthing device depicted in FIG. 2.

FIG. 3 is a perspective view showing the discharging device. As shown in the drawing, each discharging electrode 139 includes a discharging plate 134. In order to increase the contact area between the discharging plates 134 and the catalyst 137 and increase amount of discharging, the discharging electrodes 139 protruding from the upper electrode plate 132 and the discharging electrodes 139 protruding from the lower electrode plate 133 are arranged alternately. In order to further increase the amount of discharging, each discharging plate 134 is formed with a plurality of discharging needles 135 at its both side surfaces. The discharging needles 135 extend horizontally. Preferably, the discharging needles 135 may have a conical shape, which is pointed at an end, for the efficient discharging. Preferably, the electrode plates 132 and 133, the discharging plate 134 and the discharging needle 135 may be made from a metal material such as copper, zinc, steel, stainless or the like.

The catalyst 137 is provided for facilitating the discharging, and has resistance to heat and shock generated during the discharging. Preferably, the catalyst 137 may contain one selected from the group consisting of carbon, graphite, bentonite, zeolite, zinc oxide, bismuth, praseodymium, cobalt, manganese, antimon, lynconite, silicon carbide, silicon, germanium, argon gas, copper sulfate solution, potassium hydroxide solution, electrolyte, plaster, cement and combination thereof as a principal component.

The discharging plate 134 is formed with a plurality of through-holes 136, through which the catalyst 137 can flow freely. The existence of the through-holes 136 makes electric charges further aggregate on the discharging needles 135, thereby facilitating the discharging.

Preferably, a nichrome wire may be used as the heat wire 138. The heat wire 138 promptly transforms the discharging current in the discharging device 250 into the heat energy, to lower the ground potential. If adjusting the capacitance of the discharging electrodes 139 and the reactance of the heat wires 138, the impedance can be decreased.

Figure 4:
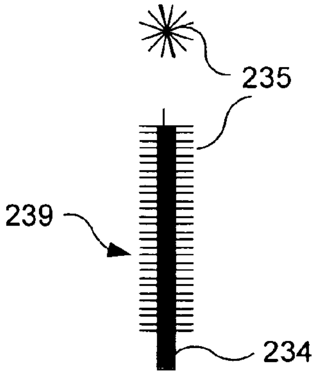
FIG. 4 is a view showing a modification of a discharging electrode of a discharging device depicted in FIG. 3.

Conclusively, by using the discharging device 250 structured as above, the present invention can perform the discharging more effectively and faster than the prior art which is affected by the soil resistivity FIG. 4 is a view showing a modification of the discharging electrode. As shown in the drawing, a modified discharging electrode 239 includes a cylindrical discharging rod 234 and a plurality of discharging needles 235 formed radially around an overall outer surface of the discharging rod 234 for increasing the contact area with the catalyst 137. In other words, the discharging electrode 239 has a brush shape.

Second Embodiment

Figure 5:
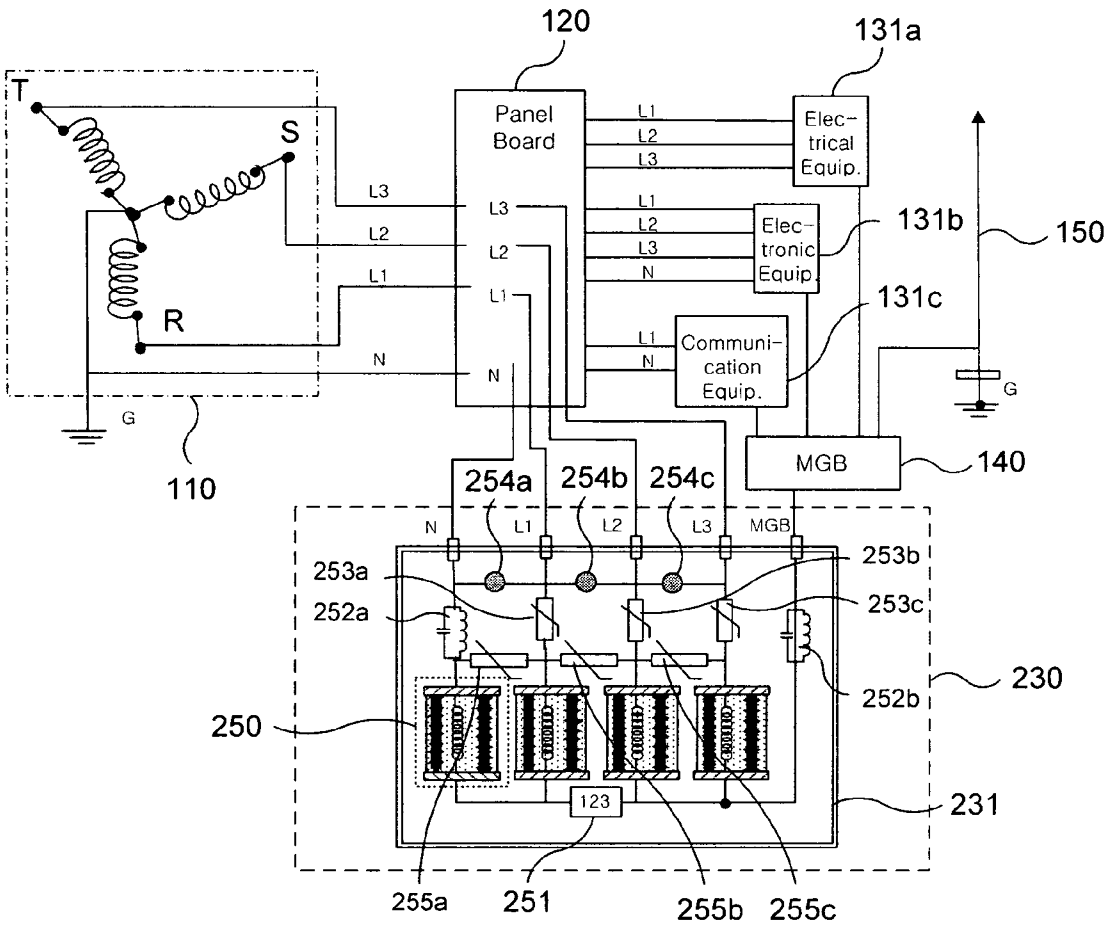
FIG. 5 is a schematic view showing an earthing device in accordance with another preferred embodiment of the present invention.

FIG. 5 is a schematic view showing an earthing device in accordance with another preferred embodiment of the present invention. As shown in the drawing, an earthing device 230 comprises an earthing panel 231 and multiple discharging devices 250 mounted inside the earthing panel 231. Lower electrode plates 233 of the respective discharging devices 250 are connected to an MGB terminal of the earthing panel 231. An upper electrode plate 232 of one of the discharging devices 250 is connected to an N-terminal of the earthing panel 231. On the other hand, upper electrode plates 232 of the remaining discharging devices 250 are connected to L-terminals of the earthing panel 231.

The MGB terminal of the earthing panel 231 is connected to the MGB 140 of a lightning rod 150, the electric equipment 131*a*, the electronic equipment 131*b* and the communication equipment 131*c*. The N-terminal of the earthing panel 231 is connected to an earth wire of the transformer 110 for supplying power to the panel board 120. The L-terminals (L1, L2and L3-terminals) of the earthing panel 231 are connected to power cables L1, L2 and L3 for supplying power the equipment 131*a*, 131*b* and 131*c* through the panel board 120.

LC filters 252*a* and 252*b* are mounted in series between the N-terminal and the discharging device 250 and between the MGB terminal and the discharging device 250, respectively. The LC filters 252*a* and 252*b* decrease a synthetic impedance of the discharging electrodes 139 and the heat wires 138, eliminate noise transmitted to the equipment 131*a*, 131*b* and 131*c* from the transformer 110, and eliminate noise generated at the equipment 131*a*, 131*b* and 131*c*.

Constant voltage elements 253*a* , 253*b* and 253*c*, such as a varistor, a gas tube, a zener diode or the like, are mounted in series between the L-terminals and the respective discharging devices 250. Constant voltage elements 255*a*, 255*b* and 255*c* are mounted in parallel with respect to the discharging devices 250 between the N-terminal and the L1-terminal, between the L1-terminal and the L2-terminal, and between the L2-terminal and L3-terminal, respectively. The constant voltage elements 253*a*, 253*b*, 253*c*, 255*a*, 255*b* and 255*c* cause the excess voltage from lightning, electrical surge, static electricity or earth fault to be discharged through the discharging devices 250 from the lightning rod 150 and the equipment 131*a*, 131*b* and 131*c*, so as to protect the lightning rod 150 and the equipment 131*a*, 131*b* and 131*c* as well as the discharging devices 250 during the discharging.

Light emitting diodes 254*a*, 254*b* and 254*c* are mounted between the N-terminal and the L1-terminal, between the L1-terminal and the L2-terminal, and between the L2-terminal and L3-terminal, respectively, as an alarm device, for indicating the operating states of the discharging devices 250 to a worker. A counter 251 is mounted between the MGB terminal and the discharging devices 250 to count the number of occurrences of lightning, electrical surge, static electricity or earth fault.

First Comparative Experiment

Figure 6:
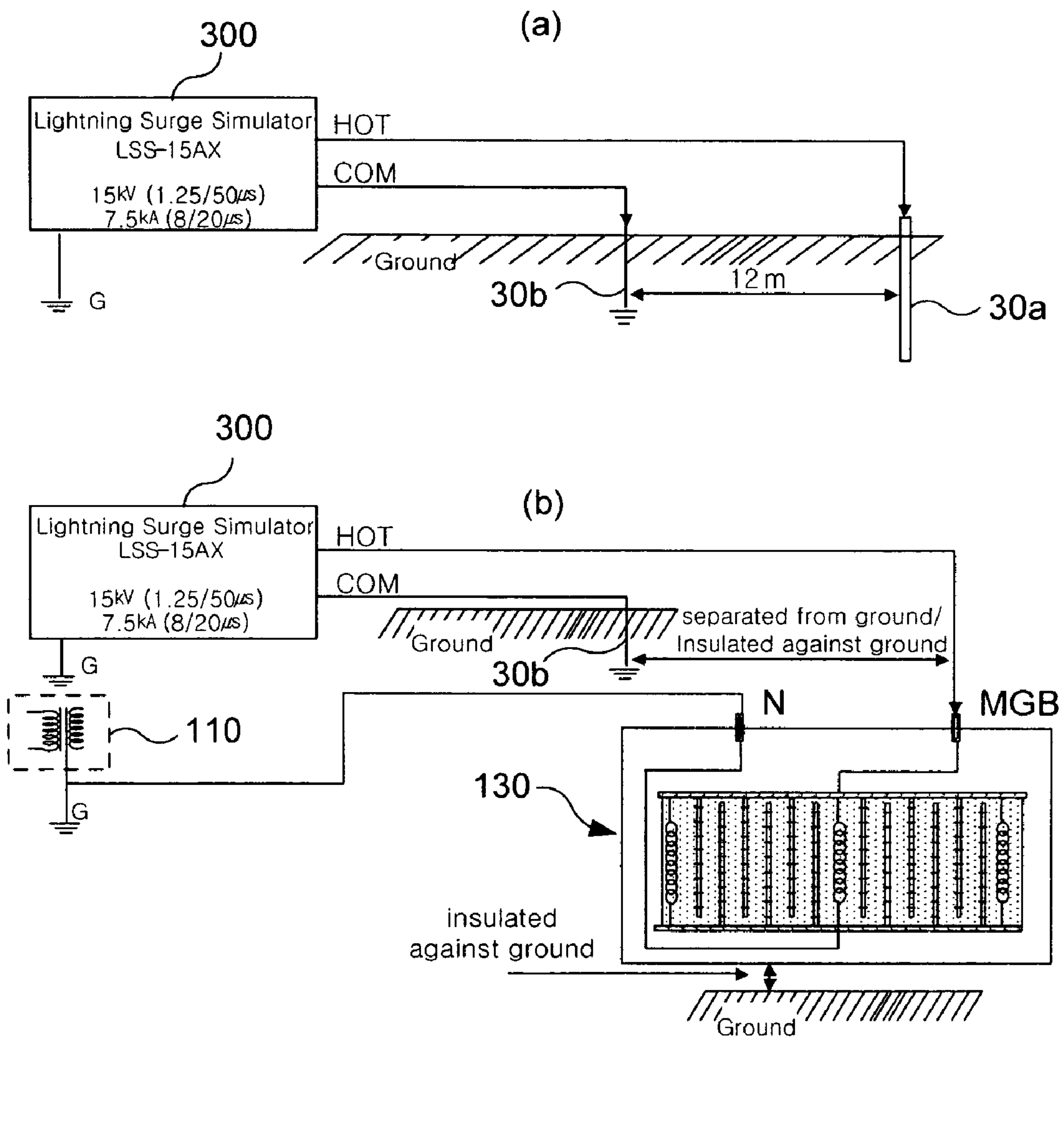
FIG. 6 is a schematic view explaining a comparative experiment about discharge current of an earthing device of a prior art and an earthing device of the present invention.

FIG. 6 is a schematic view explaining a comparative experiment about discharge current of the earthing device of the prior art and the earthing device of the present invention. FIG. 6(*a*) illustrates the prior art, and FIG. 6(*b*) illustrates the present invention.

In case of the prior art depicted in FIG. 6(*a*), a reference electrode 30*b* is located apart from the earthing electrode 30*a* by a distance of 12 m. The reference electrode 30*b* is connected to a COM terminal of a lightning surge simulator (LSS-15AX) 300, and the earthing electrode 30*a* is connected to a HOT terminal of the lightning surge simulator 300. A combination wave impulse of 15 kV(1.25/50 μs) and 7.5 kA(8/20 μs) is applied to the lightning surge simulator 300, and voltage and current generated at the lightning surge simulator 300 are measured. An operating speed is measured by an oscilloscope. The values of earth resistance and soil resistivity are measured by a Saturn GEO X.

In case of the present invention depicted in FIG. 6(*b*), the reference electrode 30*b* is connected to the COM terminal of the lightning surge simulator (LSS-15AX) 300, and the MGB terminal of the earthing device 130 is connected to the HOT terminal of the lightning surge simulator 300. The N-terminal of the earthing device 130 is connected to the earth wire of the transformer 110. The below table 1 shows results of the above comparative experiment.

TABLE 1

| test sample | number of samples | mounting method | earth resistance (Ω) | input volt. (kV) | output volt. (kV) | discharge current (kA) | current discharge speed (ms) |
|---|---|---|---|---|---|---|---|
| general earthing rod (Φ14 × 1,000) | 10 | buried under ground | 45 | 15 | 14.91 | 0.082 | <20 |
| general earthing rod (Φ22 × 1,800) | 10 | buried under ground | 20 | 15 | 14.87 | 0.085 | <20 |
| copper earth plate (500 × 500) | 10 | buried under ground | 10 | 15 | 14.92 | 0.085 | <10 |
| PGS earth rod (Φ54 × 18,000) | 1 | buried under ground | 5 | 15 | 14.65 | 0.091 | <5 |
| earthing device of the present invention (500 × 500 × 200) | 1 | mounted on ground | insulated against ground | 15 | 13.95 | 0.122 | <0.2 |

test condition: temperature: 17° C., humidity: 54%, test error: ±10%

Second Comparative Experiment

Figure 7:
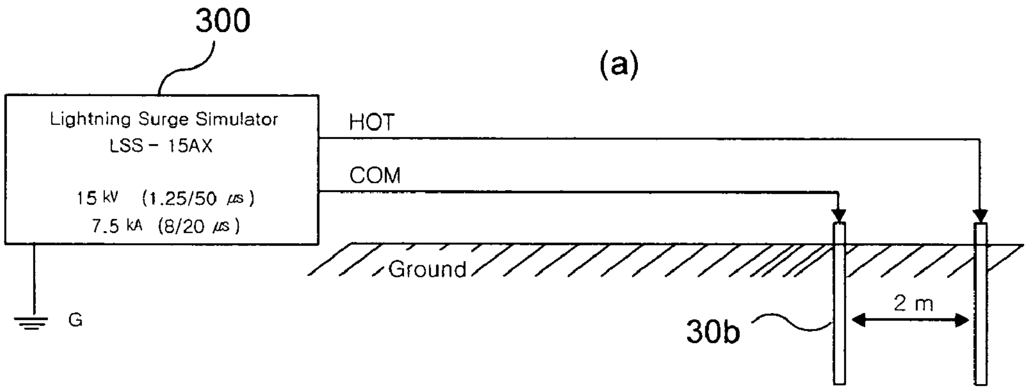
FIG. 7 is a schematic view explaining another comparative experiment about discharge current of an earthing device of a prior art and an earthing device of the present invention.
Figure 7:
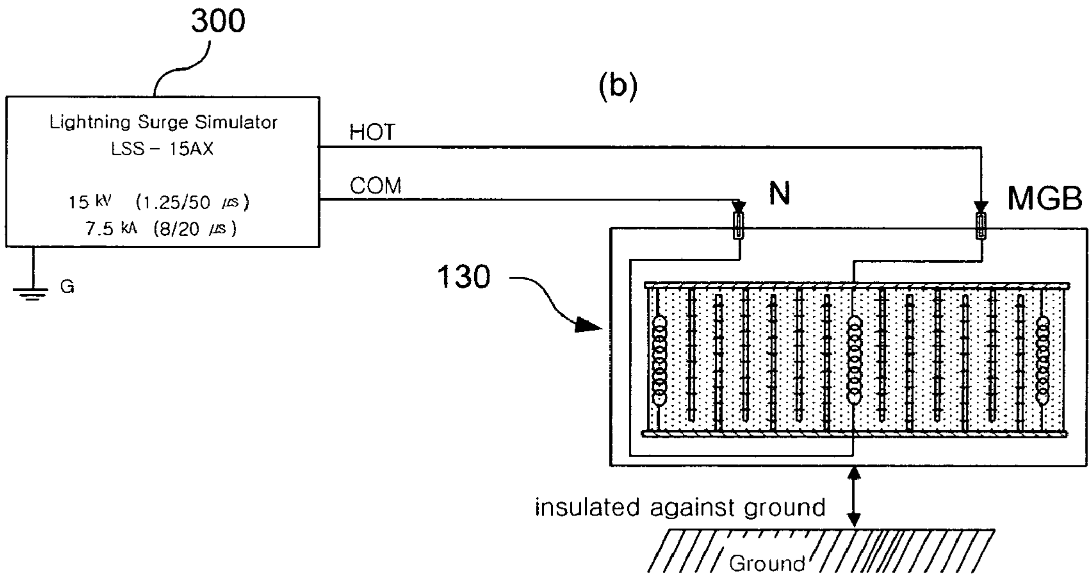

FIG. 7 is a schematic view explaining another comparative experiment about discharge current of the earthing device of the prior art and the earthing device of the present invention. FIG. 7(*a*) illustrates the prior art, and FIG. 7(*b*) illustrates the present invention.

Compared with the above first experiment, the second comparative experiment has a difference in that a distance between the reference electrode 30*b* and the earth electrode 30*a* is 2 m in case of the prior art, and the N-terminal of the earthing device 130 is connected to the COM terminal of the lightning surge simulator (LSS-15AX) 300 in case of the present invention. The below table 2 shows results of the second comparative experiment.

TABLE 2

| test sample | number of samples | mounting method | earth resistance (Ω) | input volt. (kV) | output volt. (kV) | discharge current (kA) | current discharge speed (ms) |
|---|---|---|---|---|---|---|---|
| general earthing rod (Φ14 × 1,000) | 10 | buried under ground | 45 | 15 | 14.83 | 0.122 | <10 |
| general earthing rod (Φ22 × 1,800) | 10 | buried under ground | 20 | 15 | 14.81 | 0.128 | <10 |
| copper earth plate (500 × 500) | 10 | buried under ground | 10 | 15 | 14.68 | 0.134 | <5 |
| PGS earth rod (Φ54 × 18,000) | 1 | buried under ground | 5 | 15 | 14.35 | 0.159 | <5 |
| earthing device of the present invention (500 × 500 × 200) | 1 | mounted on ground | insulated against ground | 15 | 13.96 | 2230 | <0.02 |

test condition: temperature: 17° C., humidity: 54%, test error: ±10%

It is clearly seen from the above tables 1 and 2 that the earthing device of the present invention has an advantage that the discharge current is larger and the current discharge speed is higher than the prior art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An earthing device including an earthing panel and a discharging device mounted inside the earthing panel, characterized in that:

the discharging device includes at least one electrode plate, multiple discharging electrodes coupled to the electrode plate, and catalyst filled between the discharging electrodes, wherein the discharging device includes first and second electrode plates which are disposed opposite to each other, and heat wires are connectingly mounted between the first and second electrode plates.

2. The device according to claim 1, wherein the discharging electrodes coupled to the first electrode plate are arranged alternately with the discharging electrodes coupled to the second electrode plate.

3. The device according to claim 2, wherein each of the discharging electrodes has a plate shape, and is formed with a plurality of discharging needles protruding from a side surface of the discharging electrode.

4. The device according to claim 3, wherein each of the discharging needles is pointed at an end.

5. The device according to claim 3, wherein the discharging needles are made from a metal material.

6. The device according to claim 2, wherein each of the discharging electrodes has a plate shape, and is formed with a plurality of through-holes.

7. The device according to claim 2, wherein each of the discharging electrodes has a rod shape, and is formed with a plurality of discharging needles protruding radially around an outer surface of the discharging electrode.

8. The device according to claim 7, wherein each of the discharging needles is pointed at an end.

9. The device according to claim 1, wherein the heat wires are nichrome wires.

10. The device according to claim 1, wherein the catalyst contains one selected from the group consisting of carbon, graphite, bentonite, zeolite, zinc oxide, bismuth, praseodymium, cobalt, manganese, antimon, lynconite, silicon carbide, silicon, germanium, argon gas, copper sulfate solution, potassium hydroxide solution, electrolyte, plaster, cement and combination thereof as a principal component.

11. The device according to claim 1, wherein the earthing panel is mounted on ground.

12. An earthing device including an earthing panel and a discharging device mounted inside the earthing panel, characterized in that:

the discharging device includes at least one electrode plate, multiple discharging electrodes coupled to the electrode plate, and catalyst filled between the discharging electrodes, wherein the discharging device includes first and second electrode plates which are disposed opposite to each other, wherein the discharging electrodes coupled to the first electrode plate are arranged alternately with the discharging electrodes coupled to the second electrode plate and, wherein the earthing panel includes an MGB terminal which is connected to an MGB of equipment to be earthed, an N-terminal which is connected to an earth wire of a transformer for supplying power to the equipment, and an L-terminal which is connected to a power cable of the transformer, and the earthing device includes two or more discharging devices, the first electrode plate of one of the discharging devices is connected to the N-terminal, the first electrode plate of other discharging device is connected to the L-terminal, and the second electrode plate of each of the discharging devices is connected to the MGB terminal.

13. The device according to claim 12, wherein a filter is mounted in series between the N-terminal and the discharging device.

14. The device according to claim 12, wherein a filter is mounted in series between the MGB terminal and the discharging device.

15. The device according to claim 12, wherein a constant voltage element is mounted in series between the L-terminal and the discharging device.

16. The device according to claim 12, wherein a constant voltage element is mounted in parallel with respect to the discharging device between the N-terminal and the L-terminal.

17. The device according to claim 16, wherein the earthing panel includes two or more L-terminals, and a constant voltage element is mounted in parallel with respect to the discharging device between the L-terminals.

18. The device according to claim 12, wherein an alarm device for indicating an operating state of the discharging device is mounted to the earthing panel.

19. The device according to claim 12, wherein a counter for counting an operation number of the discharging device is mounted between the MGB terminal and the discharging device.

* * * * *